US010633011B2

(12) United States Patent
Matsumoto (10) Patent No.: US 10,633,011 B2
(45) Date of Patent: Apr. 28, 2020

(54) CARRIAGE (71) Applicant: SAKAI DISPLAY PRODUCTS CORPORATION, Sakai-shi, Osaka (JP)

(72) Inventor: Naoki Matsumoto, Sakai (JP)

(73) Assignee: SAKAI DISPLAY PRODUCTS CORPORATION, Sakai-shi, Osaka (JP)

( * ) Notice: Subject to any disclaimer, the term of this patent is extended or adjusted under 35 U.S.C. 154(b) by 0 days.

(21) Appl. No.: 16/328,864

(22) PCT Filed: Aug. 29, 2016

(86) PCT No.: PCT/JP2016/075237
§ 371 (c)(1),
(2) Date: Feb. 27, 2019

(87) PCT Pub. No.: WO2018/042500
PCT Pub. Date: Mar. 8, 2018

(65) Prior Publication Data
US 2019/0210624 A1 Jul. 11, 2019

(51) Int. Cl.
*B62B 3/04* (2006.01)
*B62B 5/00* (2006.01)
(Continued)

(52) U.S. Cl.
CPC .................. *B62B 3/04* (2013.01); *B62B 5/00* (2013.01); *B65G 47/52* (2013.01); *B65G 65/00* (2013.01);
(Continued)

(58) Field of Classification Search
CPC ......... B62B 3/04; B62B 5/00; B62B 2203/60; B62B 2203/74; B65G 65/00; B65G 47/52; B65G 2201/025
See application file for complete search history.

(56) References Cited

U.S. PATENT DOCUMENTS 1,719,197 A * 7/1929 Schlothan ............... B62B 3/008
254/3 C
4,304,324 A * 12/1981 Huggins ................. B65G 65/00
198/418.6
(Continued)

FOREIGN PATENT DOCUMENTS

JP    S60-011269 U    1/1985
JP    H06-061818 U    9/1994
(Continued)

*Primary Examiner* — Erez Gurari
(74) *Attorney, Agent, or Firm* — ScienBiziP, P.C.

(57) ABSTRACT

A carriage according to the present embodiment comprises: a mounting base in which a plane for placing a freight is defined, the mounting base receiving the freight from an end part of the plane by horizontal movement; and a drop prevention part that is provided to the end part of the plane, and that prevents the freight from dropping off from the mounting base. The drop prevention part includes: a movable part that rotates about an axis along a direction perpendicular to both the vertical direction and a direction in which the freight is received; and a rotation inhibiting part that is provided between said plane and a horizontal plane on which said axis is present, and that limits the range of rotation of the movable part. The movable part includes: a contact part that comes into contact with the freight; and a weight part at which the center of gravity of the movable part is located. The contact part has an end part that projects more upward in the vertical direction than the plane. When the contact part is pressed from the inner side of the mounting base toward the outer side, the rotation inhibiting part stops the rotation of the movable part about the axis by contacting the contact part and keeps the end part of the contact part more upward in the vertical direction than the plane.

16 Claims, 6 Drawing Sheets (51) Int. Cl.
*B65G 65/00* (2006.01)
*B65G 47/52* (2006.01)

(52) U.S. Cl.
CPC ....... *B62B 2203/60* (2013.01); *B62B 2203/74* (2013.01); *B65G 2201/025* (2013.01)

(56) References Cited

U.S. PATENT DOCUMENTS

| | | | | |
|---|---|---|---|---|
| 4,320,826 A * | 3/1982 | Kramer | ................ | B65G 49/062 198/430 |
| 5,072,960 A * | 12/1991 | Sperko | ....................... | B62B 3/04 16/35 D |
| 5,320,475 A * | 6/1994 | Pinder | ....................... | B62B 1/08 414/343 |
| 9,221,486 B2 * | 12/2015 | Fine | ....................... | B62B 5/0003 |
| 9,573,610 B1 * | 2/2017 | Chaturvedi | ............. | B62B 3/022 |
| 9,585,522 B1 * | 3/2017 | Brown, Sr. | ............... | A47K 1/02 |
| 10,081,381 B2 * | 9/2018 | Lin | ......................... | B62B 3/027 |
| 2002/0011719 A1 * | 1/2002 | Eskridge | ................... | B62B 1/12 280/651 |
| 2003/0099537 A1 * | 5/2003 | Riordan | ..................... | B62B 3/04 414/800 |
| 2014/0140797 A1 * | 5/2014 | Howe | ..................... | B62B 3/027 414/498 |
| 2014/0369801 A1 * | 12/2014 | Beauchamp | .......... | B62B 5/0003 414/800 |
| 2016/0304109 A1 * | 10/2016 | Andreas | ................. | B65G 65/00 |
| 2019/0084768 A1 * | 3/2019 | Vogt | ....................... | B65G 23/00 |
| 2019/0210624 A1 * | 7/2019 | Matsumoto | ............... | B62B 3/04 |

FOREIGN PATENT DOCUMENTS

| | | |
|---|---|---|
| JP | H07-232808 A | 9/1995 |
| JP | 2014-088248 A | 5/2014 |

\* cited by examiner

CARRIAGE

TECHNICAL FIELD

The present invention relates to a carriage for transporting freight.

BACKGROUND ART

A carriage including a loading table is conventionally used to transport freight. The loading table has a defined flat surface on which the freight is loaded.

The freight is received on the loading table from an end portion of the flat surface of the loading table by horizontal movement. A worker pushes and pulls the carriage to transport the freight to a warehouse for example.

When the worker pushes and pulls the carriage, the freight is often displaced on the loading table. In order to prevent the displaced freight from falling from the loading table, a pin is placed at the end portion of the flat surface of the loading table. However, there is a concern that the freight will fall from the loading table in a case where the worker forgets to place the pin.

A picking carriage disclosed in Patent Literature 1 is provided with a picking operation section on a back portion of the carriage and a carrying section on a front portion of the carriage. A storage container (freight) in Patent Literature 1 is loaded to the picking operation section of the carriage from a lateral direction and then pulled on to the carrying section. Between the picking operation section and the carrying section, an anti-back stopper is provided to prevent the freight from moving back to the picking operation section from the carrying section.

The anti-back stopper is rotatably supported by a stopper mounting member. A portion of the anti-back stopper normally protrudes farther upward than a carrying surface. Upon coming in contact with the freight pulled on the carrying section, the anti-back stopper rotates until an uppermost section of the anti-back stopper is lower than the carrying surface. Upon being released from contact with the freight, the anti-back stopper rotates backwards by the weight thereof, and returns to an original posture. When coming in contact with freight moving back toward the picking operation section, the anti-back stopper does not rotate because the anti-back stopper comes in contact with the stopper mounting member. Therefore, the freight is stopped and cannot move back to the picking operation section.

In a case where such an anti-back stopper is provided on the end portion of the flat surface of the loading table, the freight can be prevented from falling due to the worker forgetting to place the pin.

CITATION LIST

Patent Literature

[Patent Literature 1]
Japanese Patent Application Laid-Open Publication No. 2014-088248

SUMMARY OF INVENTION

Technical Problem

However, in the picking carriage disclosed in Patent Literature 1, pushing force from the freight moving back toward the picking operation section is applied more to an upper part than a rotational center of the anti-back stopper, and reaction force from the stopper mounting member is applied more to a lower part than the rotational center of the anti-back stopper. Therefore, stress on the anti-back stopper is great. An anti-back stopper that has been damaged by the stress cannot catch the freight, and the freight falls from the loading table as a result.

The present invention takes these circumstances into account and aims to provide a carriage capable of preventing the freight from falling.

Solution to Problem

A carriage according to embodiments of the present invention includes a loading table on which a flat surface is defined and a fall prevention section. The freight is to be loaded on the flat surface. The loading table receives the freight by horizontal movement from an end portion of the flat surface. The fall prevention section is provided to the end portion of the flat surface and prevents the freight from falling from the loading table. The fall prevention section includes: a movable section that turns around an axis extending in a direction perpendicular to both a vertical direction and a direction in which the freight is received; and a turn inhibiting section provided between the flat surface and a horizontal plane on which the axis is present. The turn inhibiting section limits a range in which the movable section turns. The movable section includes: a contact section that comes in contact with the freight; and a weight section in which the center of gravity of the movable section is located. The contact section has an end portion protruding farther upward in the vertical direction than the flat surface. The end portion moves farther downward in the vertical direction than the flat surface along with turning of the moveable section around the axis when the contact section is pushed inward from outside of the loading table. The turn inhibiting section stops the turning of the movable section around the axis by coming in contact with the contact section when the contact section is pushed outwards from inside of the loading table. The turn inhibiting section holds the end portion of the contact section farther upward in the vertical direction than the flat surface.

Advantageous Effects of Invention

In a carriage according to the embodiments of the present invention, the freight can be prevented from falling from the loading table.

DESCRIPTION OF EMBODIMENTS

The following describes the present invention in detail based on the accompanying drawings which illustrate embodiments thereof.

First Embodiment

Figure 1:
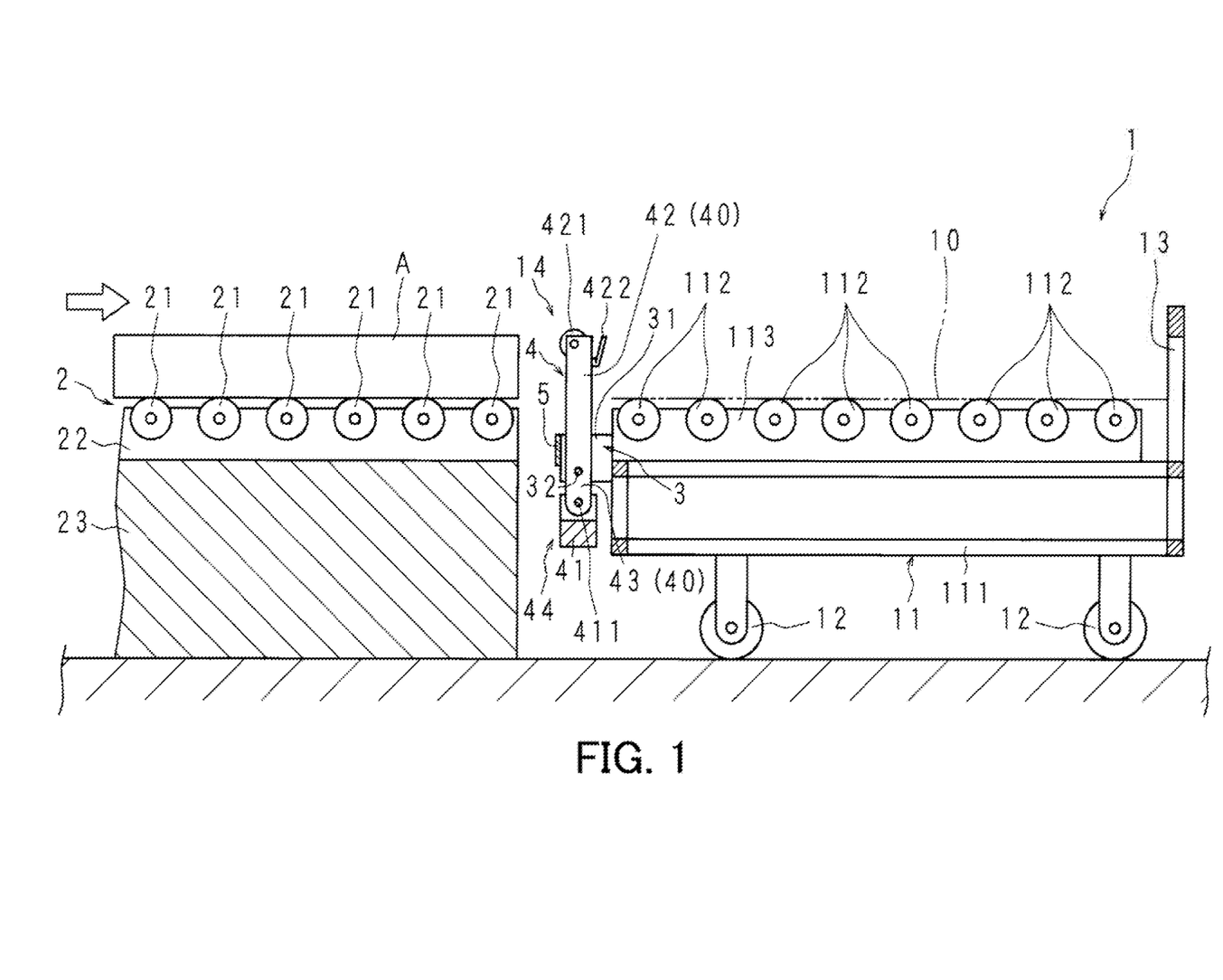
FIG. 1 is a cross-sectional view which schematically illustrates a configuration of a carriage according to a first embodiment.

FIG. 1 is a cross-sectional view which schematically illustrates a configuration of a carriage according to a first embodiment.

A carriage 1 in the drawings is used to transport freight A. The freight A is for example a packing box containing a device.

Figure 2:
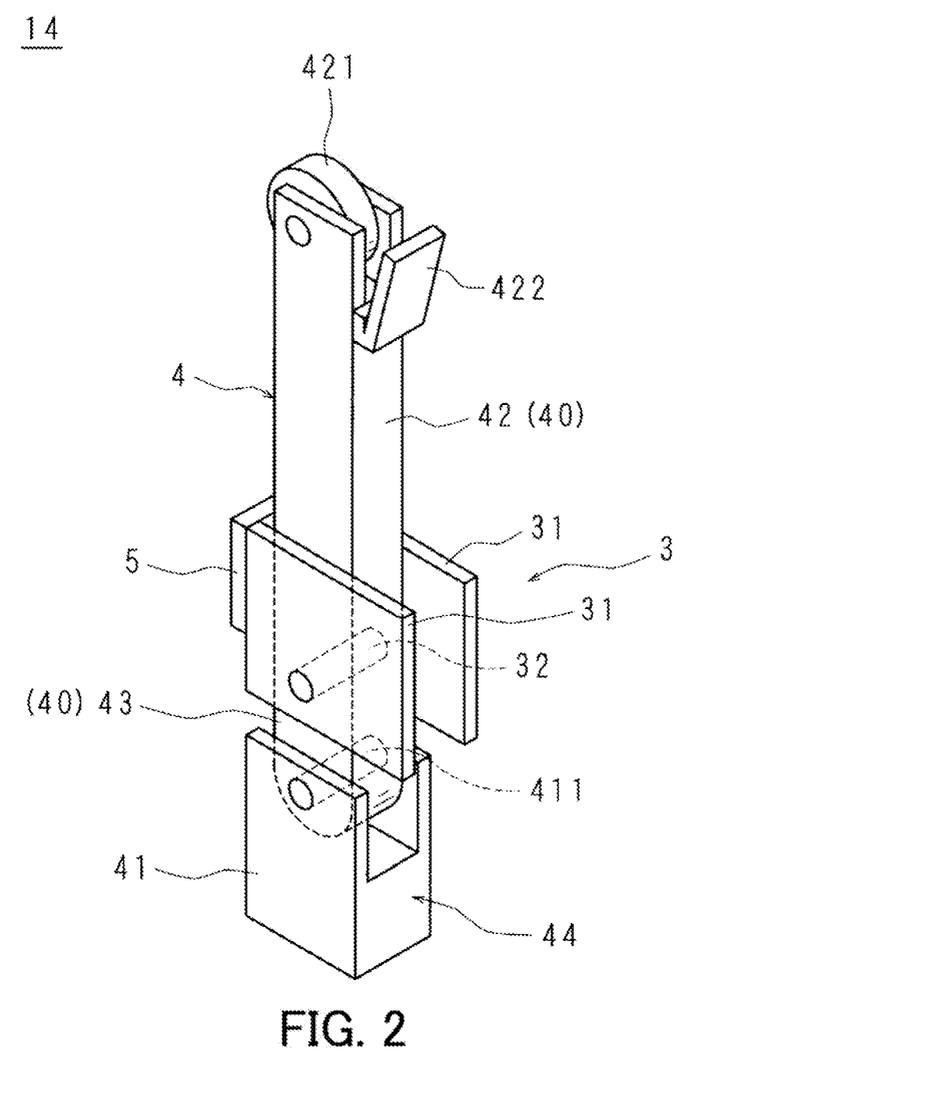
FIG. 2 is a perspective view which schematically illustrates a configuration of a fall prevention section included in the carriage.

The freight A is horizontally conveyed on a conveyance path 2 and moved from the terminus of the conveyance path 2 to the carriage 1. The conveyance path 2 illustrated in FIG. 2 is provided with a plurality of rollers 21, a roller support section 22, and a pedestal 23. The roller support section 22 is installed on the pedestal 23. The rollers 21 are arranged side by side in a conveyance direction of the freight A. Each roller 21 is supported by the roller support section 22 so as to rotate around a horizontal axis orthogonal to the conveyance direction of the freight A.

The carriage 1 includes a loading table 11, a plurality of wheels 12, a handle 13, and a fall prevention section 14. The loading table 11 includes a base 111, a plurality of rollers 112, and a roller support section 113.

The base 111 is for example a frame with a rectangular parallelepiped contour. The wheels 12 are installed on a lower portion of the base 111.

A loading surface 10 (flat surface on which the freight A is to be loaded) is defined on the loading table 11, as described later. Upon being moved from the conveyance path 2 to the carriage 1, the freight A is received on the loading table 11 from an end portion of the loading surface 10 by horizontal movement. In the following, a horizontal moving direction of the freight A when being received (that is, a direction in which the freight A is received) is referred to as a backward direction. In addition, the end portion of the above-described loading surface 10 is referred to as a front end portion of the loading surface 10.

The roller support section 113 is installed on an upper portion of the base 111. The rollers 112 are arranged side by side in a front-back direction. Each roller 112 is supported by the roller support section 113 so as to rotate around an axis extending in a left-right direction (that is, a direction perpendicular to both a vertical direction and the backward direction). The loading surface 10 according to the present embodiment is a virtually flat surface on the rollers 112 defined by contact points with a lower surface of the freight A loaded on to the loading surface 10. Note that a group of the rollers 112 arranged side by side in the front-back direction may also be arranged side by side in the left-right direction.

The handle 13 is provided on a back end portion of the loading surface 10. The handle 13 includes a horizontal bar-shaped gripping section to be gripped by a worker for example, and two legs supporting the gripping section. The two legs of the handle 13 protrude higher above the base 111 than the loading surface 10. The gripping section of the handle 13 bridges the top ends of the two legs.

The fall prevention section 14 is provided on the front end portion of the loading surface 10. The fall prevention section 14 includes a support section 3, a movable section 4, and a turn inhibiting section 5.

FIG. 2 is a perspective view which schematically illustrates a configuration of the fall prevention section 14.

Figure 3:
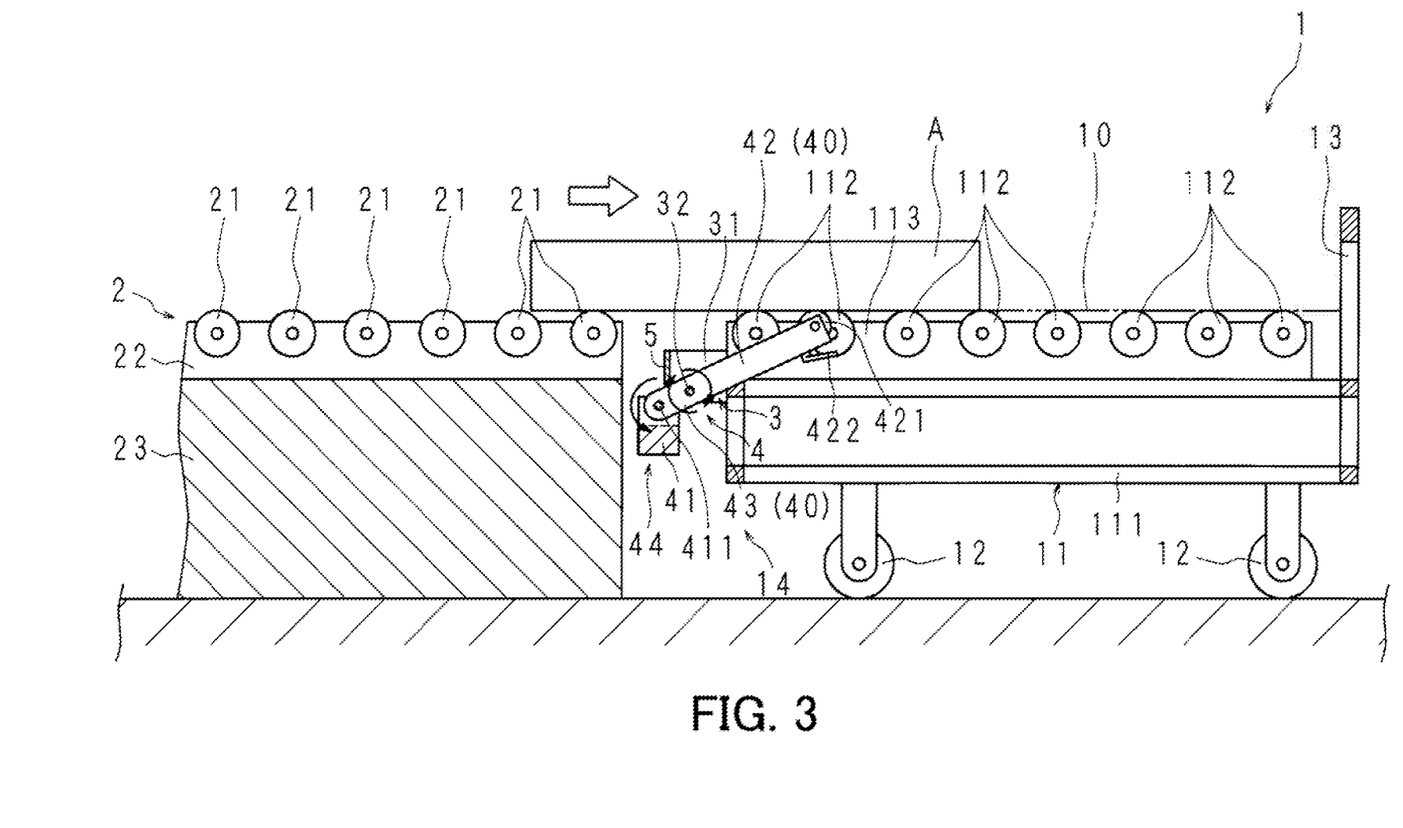
FIG. 3 is a cross-sectional view of a state in which freight is in contact with the fall prevention section.

FIG. 3 is a cross-sectional view of a state in which the freight A is in contact with the fall prevention section 14.

Figure 4:
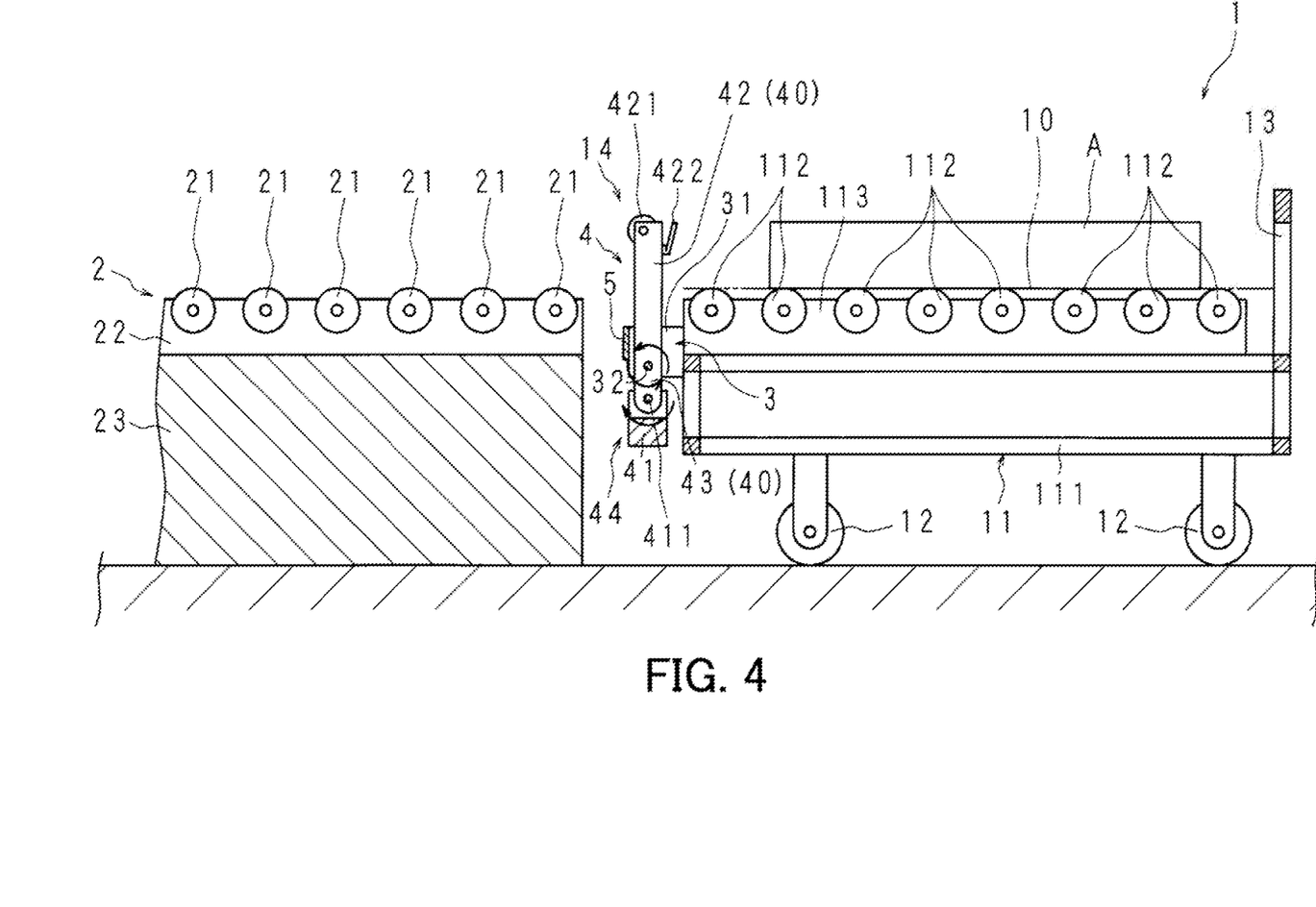
FIG. 4 is a cross-sectional view of a state in which the freight is received on a loading table included in the carriage.

FIG. 4 is a cross-sectional view of a state in which the freight A is received on the loading table 11.

Figure 5:
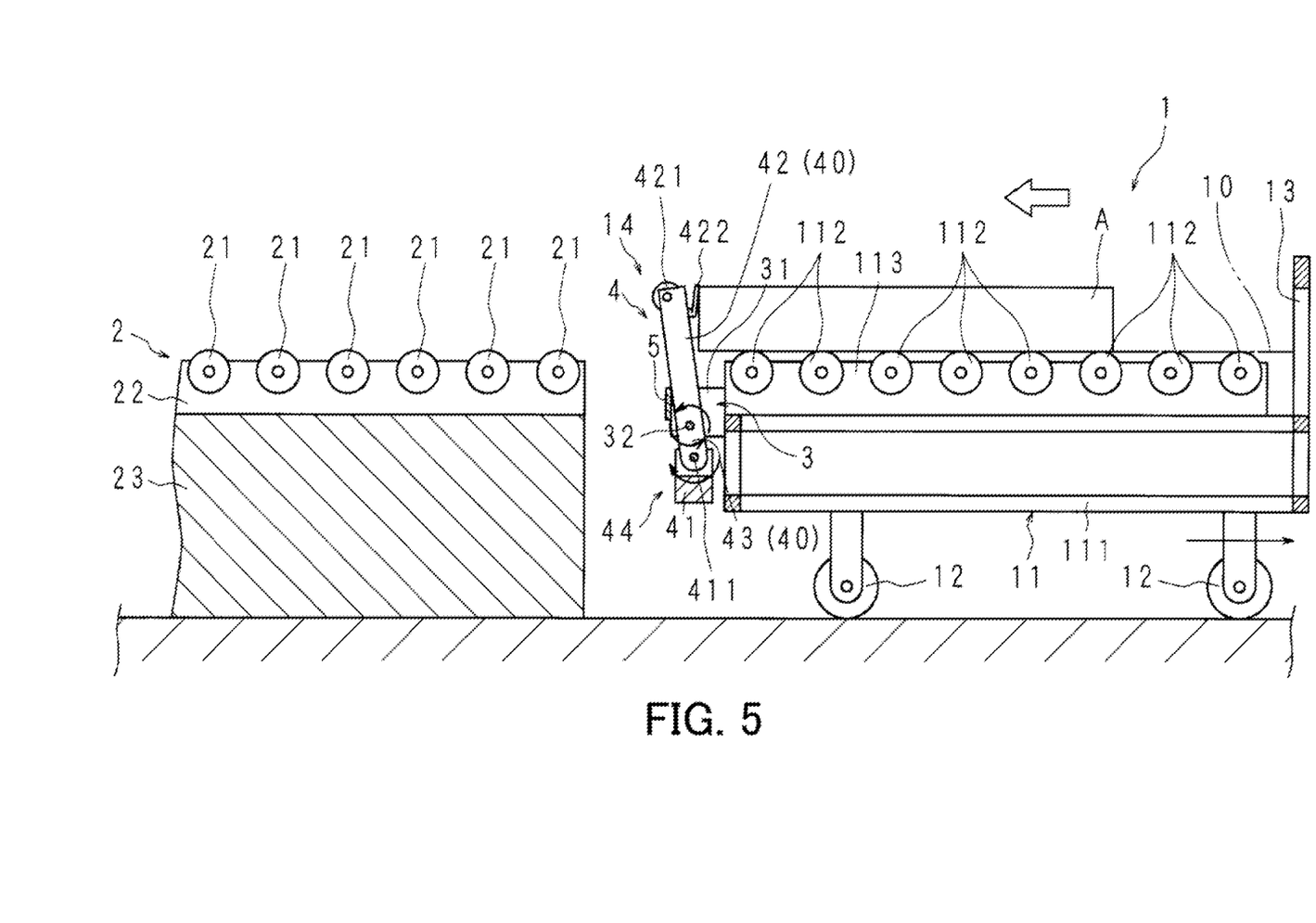
FIG. 5 is a cross-sectional view of a state in which the fall prevention section catches the freight.

FIG. 5 is a cross-sectional view of a state in which the fall prevention section 14 catches the freight A.

The support section 3 includes two support plates 31 and a shaft member 32. Each support plate 31 is a flat plate, for example. The support plates 31 are mounted on a front portion of the base 111 so as to protrude forward from the base 111 beneath the loading surface 10. The support plates 31 are arranged parallel to and apart from each other in the left-right direction. The shaft member 32 is supported between the support plates 31 so as to extend in the left-right direction, and a central axis thereof (also referred to in the following as a first axis) is horizontal. The shaft member 32 according to the present embodiment is supported on both ends thereof, but may also be supported on one of the ends only.

The movable section 4 includes a base 40 and a weight member 41. The base 40 is a straight bar member made of light metal (aluminum) for example. A first through hole is formed in the base 40 partway along the base 40 in a longitudinal direction thereof. The first through hole extends in a direction intersecting the longitudinal direction. A second through hole is formed extending in the same direction as the first through hole on one end of the base 40 in the longitudinal direction.

The base 40 is mounted to the support section 3. Specifically, the shaft member 32 is inserted through the first through hole formed in the base 40, and both ends of the shaft member 32 inserted through the first through hole are joined to the support plates 31. In this configuration, the shaft member 32 is fitted to a bearing fixed to the base 40 (or the support plates 31) and fixed to the support plates 31 (or the base 40).

The weight member 41 is made of heavy metal (iron), for example. The weight member 41 is joined to one end of the base 40 in the longitudinal direction thereof so as to turn around a central axis (also referred to as a second axis in the following) of a shaft member 411 parallel to the central axis of the shaft member 32. The weight member 41 includes a block-shaped weight main body and two protrusions extended from an upper surface of the weight main body. The shaft member 411 is inserted through the second through hole formed in the base 40, and both ends of the shaft member 411 are joined to the two protrusions of the weight member 41. In this configuration, the shaft member 411 is fastened to a bearing fixed to the base 40 (or the weight member 41) and fixed to the weight member 41 (or the base 40).

In the following, a part of the base 40 from an end portion not joined to the weight member 41 (that is, an end portion of the base 40 farthest from the first through hole) to the first through hole is referred to as a contact section 42, and a part of the base 40 from the first through hole to the end portion joined to the weight member 41 is referred to as a base section 43. The base section 43 is continuous with the contact section 42. The weight member 41 is joined to the farthest end portion of the base section 43 from the first through hole.

A reception support section 421 and a damage prevention section 422 are provided on the end portion of the base 40 to which the weight member 41 is not joined. The reception support section 421 illustrated in the drawings is a roller. The reception support section 421 is supported by the contact section 42 so as to rotate around an axis parallel to the central axis of the shaft member 32. The damage prevention section 422 illustrated in the drawings is a rectangular plate. A pair of parallel sides of the damage prevention section 422 is parallel to the central axis of the shaft member 32. The damage prevention section 422 is mounted on the contact section 42 and is inclined with respect to the longitudinal direction of the base 40 such that the side closer to the shaft member 32 of the two sides is near the contact section 42 and the side farther from the shaft member 32 of the two sides is away from the contact section 42.

The movable section 4 described above is supported by the support section 3 so as to turn around the central axis (axis extending in the left-right direction) of the shaft member 32. When external force (for example, pushing force on the contact section 42 in the front-back direction) is not being applied to the movable section 4 (refer to FIGS. 1, 2, and 4), the movable section 4 stands vertically in the longitudinal direction of the base 40 such that the shaft member 411 is positioned directly beneath the shaft member 32 because the weight member 41 is stationary hanging down from the shaft member 411. In this state, the contact section 42 is positioned farther upward on the movable section 4 than a horizontal plane on which the central axis of the shaft member 32 is present, and the weight member 41 and the base section 43 are positioned farther downward on the movable section 4 than the horizontal plane on which the central axis of the shaft member 32 is present. In the following, the weight member 41 and the base section 43 are collectively referred to as a weight section 44.

The weight section 44 is heavier than the contact section 42. A moment of inertia of the weight section 44 around the shaft member 32 is greater than a moment of inertia of the contact section 42 around the shaft member 32. The center of gravity of the movable section 4 is located within the weight section 44 (more specifically, the weight member 41).

In the following, a state in which the movable section 4 is stationary without external force being applied thereto is simply referred to as the movable section 4 being stationary. When the movable section 4 is stationary, the farthest end portion of the contact section 42 from the shaft member 32 protrudes farther upward in the vertical direction than the loading surface 10. In other words, the contact section 42 has an end portion protruding farther upward in the vertical direction than the loading surface 10 under a condition that the movable section 4 is stationary. In the following, the end portion of the contact section 42 protruding farther upward in the vertical direction than the loading surface 10 under the condition that the movable section 4 is stationary is referred to as a protruding end portion of the contact section 42.

The previously described reception support section 421 and damage prevention section 422 are provided on the protruding end portion of the contact section 42. When the movable section 4 is stationary, a portion of the peripheral surface of the reception support section 421 protrudes farther forward than the contact section 42 and farther upward in the vertical direction than the loading surface 10. Also, when the movable section 4 is stationary, the damage prevention section 422 is more inclined in the backward direction than the reception support section 421 at the back of the reception support section 421.

When the contact section 42 of the stationary movable section 4 is pushed inward from outside of the loading table 11 (that is, backward), the movable section 4 turns around the central axis of the shaft member 32 (clockwise in the drawings) and the contact section 42 falls backward (refer to FIG. 3). In this state, the contact section 42 moves backward and downward following an arc around the central axis of the shaft member 32 (first axis) along with the clockwise turning of the movable section 4. By contrast, the weight section 44 moves forward and upward following the arc around the first axis. The weight member 41 turns around the central axis of the shaft member 411 and hangs down from the shaft member 411.

When the contact section 42 is no longer being pushed, the movable section 4 turns counterclockwise in the drawings by the weight of the weight section 44 (refer to FIG. 4). In this state, the contact section 42 moves forward and upward following the arc around the first axis along with the counterclockwise turning of the movable section 4. By contrast, the weight section 44 moves backward and downward following the arc around the first axis. The weight member 41 turns around the central axis of the shaft member 411 (second axis) and hangs down from the shaft member 411.

The turn inhibiting section 5 is provided between the loading surface 10 and the horizontal plane on which the central axis of the shaft member 32 is present, and in front of the movable section 4. The turn inhibiting section 5 and the contact section 42 are opposite each other in the front-back direction, and the turn inhibiting section 5 bridges front end portions of the support plates 31 such that a space is provided between the turn inhibiting section 5 and the contact section 42 when the movable section 4 is stationary. The turn inhibiting section 5 according to the present embodiment is a flat plate. Note that the turn inhibiting section 5 is not limited to a flat plate, and may be a bar. The turn inhibiting section 5 may also be integrated with or separated from the support plates 31.

When the contact section 42 is pushed outward (that is forward) from inside of the loading table 11, the movable section 4 is urged to turn around the central axis of the shaft member 32 (counter clockwise in the drawings) (refer to FIG. 5). However, the movable section 4 is stopped from turning because the contact section 42 comes in contact with the turn inhibiting section 5. At this time, a longitudinal direction of the damage prevention section 422 matches the vertical direction because the base 40 falls slightly forward. As a result, the protruding end portion of the contact section 42 is held farther upward in the vertical direction than the loading surface 10. As such, the turn inhibiting section 5 limits the range in which the movable section 4 turns (counterclockwise in the drawings) around the central axis of the shaft member 32.

When the freight A is moved to the carriage 1 as described above, the worker puts the carriage 1 near the terminus of the conveyance path 2 such that the front end portion of the loading surface 10 faces the conveyance path 2, then stops the carriage 1. Next, the worker moves the freight A from the terminus of the conveyance path 2 toward the loading table 11 (refer to FIG. 1).

The freight A that has horizontally moved backward on the carriage 1 is in contact with the contact section 42. The contact section 42 is pushed backward by the horizontally moving freight A. In this state, the movable section 4 turns (clockwise in the drawings). The protruding end portion of the contact section 42 moves farther downward in the vertical direction than the loading surface 10 along with the turning of the movable section 4 (refer to FIG. 3).

The freight A goes over the contact section 42 that has moved farther downward in the vertical direction than the loading surface 10. In this state, the freight A horizontally moves smoothly because the reception support section 421 provided on the protruding end portion of the contact section 42 rotates while in contact with the freight A. Therefore, the loading table 11 can smoothly receive the freight A.

When the protruding end portion of the contact section 42 is located farther downward in the vertical direction than the loading surface 10, a part of the fall prevention section 14 other than the reception support section 421 is not in contact with the freight A. Therefore, the fall prevention section 14 does not obstruct reception of the freight A.

When the contact section 42 moves backward and downward along with the clockwise turning of the movable section 4, the base section 43 moves forward and upward. However, the base section 43 does not move so much that a lower end of the base section 43 collides with the pedestal 23 of the conveyance path 2. Because the weight member 41 hangs down from the shaft member 411 which is the lower end of the base section 43, the weight member 41 does not collide with the pedestal 23 of the conveyance path 2.

When the movable section 4 turns around the central axis of the shaft member 32, the weight member 41 hanging down from the shaft member 411 by the weight thereof turns around the central axis of the shaft member 411. Therefore, an upward movement distance of the weight member 41 is short. Therefore, the stationary movable section 4 easily turns even when receiving small pressing force in the front-back direction. Accordingly, the worker can move the freight A from the conveyance path 2 to the loading table 11 with a small force.

Upon the freight A that has gone over the contact section 42 by backward horizontal movement on the loading table 11 being separated from the reception support section 421, the protruding end portion of the contact section 42 again protrudes farther upward in the vertical direction than the loading surface 10 as illustrated in FIG. 4 because the movable section 4 turns counterclockwise due to the weight of the weight section 44.

The worker who has finished moving the freight A from the conveyance path 2 to the carriage 1 grips the handle 13 to push and pull the carriage 1. In this state, the wheels 12 roll over a floor. The freight A is transported to a warehouse, for example.

The freight A loaded on the rollers 112 is easily displaced in the front-back direction when the worker pushes and pulls the carriage 1. The freight A that has been displaced backward is caught by the handle 13. Therefore, the freight A is prevented from falling from the loading table 11.

When the freight A that has been received on the loading table 11 is displaced forward due to pushing and pulling of the carriage 1, the contact section 42 is pushed forward by the freight A because the freight A moving horizontally comes in contact with the damage prevention section 422 (refer to FIG. 5). At this time, the protruding end portion of the contact section 42 is in contact with the turn inhibiting section 5. Then, the protruding end portion of the contact section 42 is held farther upward in the vertical direction than the loading surface 10 because the turning of the movable section 4 is inhibited. Therefore, the protruding end portion of the contact section 42 (more specifically, damage prevention section 422) catches the freight A. Accordingly, the freight A can be prevented from falling from the loading table 11.

Because the rectangular plate-shaped damage prevention section 422 makes contact with the freight A on an entire flat surface thereof facing the freight A, reaction force from the damage prevention section 422 to the freight A is distributed. Therefore, damage to the freight A can be prevented. Also, because the surface area of the damage prevention section 422 that catches the freight A is wide, the damage prevention section 422 can surely catch the freight A.

Pushing force applied to the movable section 4 from the freight A at the freight A being caught and reaction force applied to the movable section 4 from the turn inhibiting section 5 are both applied to the contact section 42 included in the movable section 4. Therefore, stress on the movable section 4 is small in the carriage 1 as compared to the picking carriage disclosed in Patent Literature 1, which has a configuration such that the pushing force applied to the movable section 4 from the freight A is applied to the contact section 42 above the shaft member 32 and the reaction force applied to the movable section 4 from the turn inhibiting section 5 is applied to the base section 43 below the shaft member 32. Accordingly, the movable section 4 can be prevented from receiving great load and being damaged by the load. Consequently, the freight A can be prevented from falling from the loading table 11 due to the damaged movable section 4 failing to catch the freight A.

Because the center of gravity of the movable section 4 is located within the weight member 41, the movable section 4 easily returns to a stationary state from a turned state. Therefore, unnecessary swinging of the movable section 4 can be prevented.

Because the base 40 and the weight member 41 are separate members, the weight member 41 of a material differing from that of the base 40 can be joined to the base section 43. Accordingly, the center of gravity of the movable section 4 can be set to an appropriate height using a weight member 41 that is heavier than the base 40. The lower the center of gravity of the movable section 4 is with respect to the position of the central axis of the shaft member 32, the more easily the movable section 4 returns from the turned state to a state where the protruding end portion of the contact section 42 protrudes farther upward in the vertical direction than the loading surface 10.

In a case where the freight A is a styrene foam packing box containing a device for example, if a foreign object (for example a styrene foam fragment) produced due to damage to the packing box is caught between the contact section 42 and the turn inhibiting section 5, the protruding end portion of the contact section 42 does not catch the freight A because the protruding end portion of the contact section 42 is held farther downward in the vertical direction than the loading surface 10. Therefore, there is a concern that the freight A that is displaced forward may fall from the loading table 11.

In the carriage 1, because a space is provided between the contact section 42 and the turn inhibiting section 5 under the condition that the movable section 4 is stationary, the foreign object produced due to the damage to the packing box caused by contact between the freight A and the rollers 112 or the reception support section 421 goes between the contact section 42 and the turn inhibiting section 5 and falls through the space between the contact section 42 and the turn inhibiting section 5. That is, the foreign object is not caught between the contact section 42 and the turn inhibiting section 5.

Note that the carriage 1 may additionally include a plurality of fall prevention sections 14. In this case, the fall prevention sections 14 are aligned with the front end portion of the loading surface 10 in the left-right direction. Also, a pin such as that conventionally used to prevent falling of the freight A may be stood on a left or right side of the fall prevention section 14 on the front end portion of the loading surface 10.

The reception support section 421 is not limited to a roller. For example, the reception support section 421 may be a non-rotating cylinder with an axis extending in the left-right direction. The reception support section 421 is also not limited to a separate member mounted to the contact section 42. For example, the reception support section 421 may be a curved surface formed on the protruding end portion of the contact section 42.

The damage prevention section 422 is not limited to a flat plate. For example, the damage prevention section 422 may be a shock-absorbing block. The damage prevention section 422 is also not limited to a separate member mounted to the contact section 42. For example, the damage prevention section 422 may be a flat surface formed on the protruding end portion of the contact section 42.

When the support section 3 includes a part facing the contact section 42 in the front-back direction, a space is preferably provided between the contact section 42 and the part of the support section 3 facing the contact section 42 under a condition that the contact section 42 is not pushed. In this case, the freight A can be prevented from falling from the loading table 11 due to a foreign object being caught between the contact section 42 and the part of the support section 3 facing the contact section 42.

According to the present embodiment, an arrangement position of the contact section 42 in the left-right direction is the same as an arrangement position of the weight member 41 in the left-right direction because the base 40 is straight bar-shaped. However, the arrangement positions of the contact section 42 and the weight member 41 in the left-right direction may also be varied by using a base 40 that is bar-shaped with a bend partway in a lengthwise direction thereof, for example.

Second Embodiment

Figure 6:
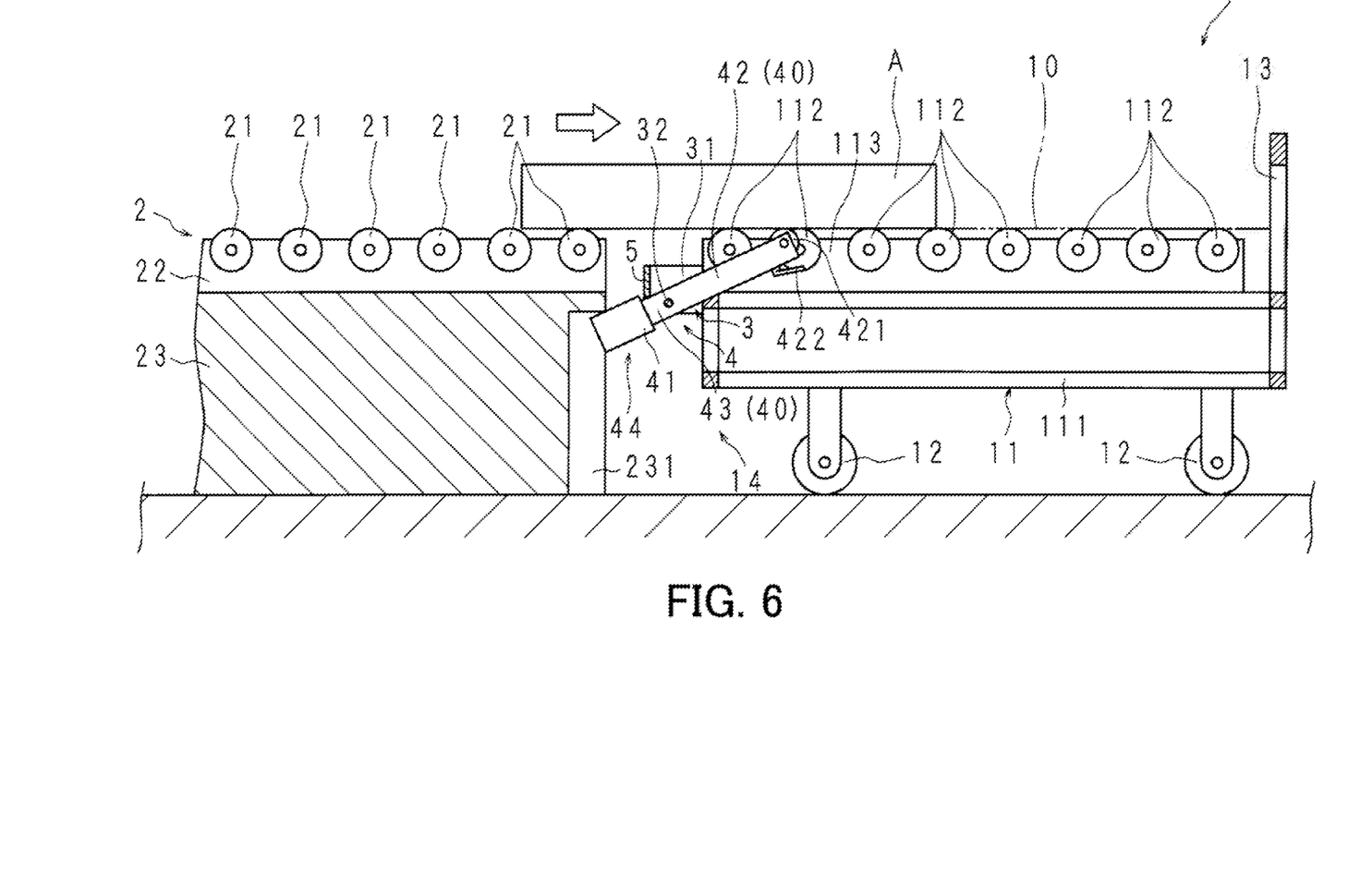
FIG. 6 is a cross-sectional view which schematically illustrates a configuration of a carriage according to a second embodiment.

FIG. 6 is a cross-sectional view which schematically illustrates a configuration of a carriage 1 according to a second embodiment.

The carriage 1 according to the present embodiment has a configuration substantially similar to that of the carriage 1 according to the first embodiment. The carriage 1 according to the present embodiment achieves a substantially similar functional effect to the carriage 1 according to the first embodiment. In the following, points of difference between the first and second embodiments are described. Elements corresponding to those in the first embodiment are labelled with the same reference signs and description thereof is omitted.

The weight member 41 is fixedly joined to the farthest end portion of the base section 43 from the shaft member 32. That is, the weight member 41 does not turn around the central axis of the shaft member 411. The weight member 41 protrudes farther forward than the lower end of the base section 43 when the movable section 4 turns clockwise and the protruding end portion of the contact section 42 moves farther downward in the vertical direction than the loading surface 10.

An opening 231 is formed in the pedestal 23 of the conveyance path 2. The opening 231 extends toward the back of the pedestal 23 and leads to a space inside of the pedestal 23. The weight member 41 protruding farther forward than the lower end of the base section 43 is inserted into the space inside of the pedestal 23 through the opening 231. Therefore, a collision of the weight member 41 with the pedestal 23 can be avoided.

Note that the weight member 41 is not limited to a configuration of being externally joined to the base section 43. For example, the weight member 41 may be built into the base section 43.

Finally, the first and second embodiments are summarized.

According to the embodiments, the contact section has an end portion protruding farther upward in the vertical direction than the flat surface (referred to as the loading surface in the following) on which the freight is to be loaded.

When the freight is received on the loading table, the contact section is pushed inward from the outside of the loading table by the freight moving horizontally. At this time, the movable section turns in one direction and the contact section falls backward. The end portion of the contact section moves farther downward in the vertical direction than the loading surface along with the turning of the movable section in the one direction. Therefore, the fall prevention section does not obstruct the reception of the freight.

Upon the freight being separated from the contact section, the movable section turns in the opposite direction due to the weight of the weight section. The end portion of the contact section again protrudes farther upward in the vertical direction than the loading surface along with the turning of the movable section in the opposite direction.

When the freight received on the loading table is displaced toward the end portion of the loading surface, the contact section is pushed outward from the inside of the loading table by the freight moving horizontally. At this time, the turning of the movable section is inhibited because the end portion of the contact section comes in contact with the turn inhibiting section. Therefore, the freight is caught by the end portion of the contact section held farther upward in the vertical direction than the loading surface. Accordingly, the freight can be prevented from falling from the loading table.

The pushing force applied to the movable section from the freight and reaction force applied to the movable section from the turn inhibiting section are both applied to the contact section included in the movable section. Therefore, according to the embodiments, a load on the movable section is small as compared to the picking carriage disclosed in Patent Literature 1. Accordingly, damage to the movable section due to receiving a great load can be prevented. Consequently, the freight can be prevented from falling from the loading table due to a damaged movable section failing to catch the freight.

According to the embodiments, the base section and the weight member are separate from each other. Therefore, a weight member of a material differing from the base section can be joined to the base section. Accordingly, the center of gravity of the movable section can be set to an appropriate height using a weight member that is heavier than the base section. The lower the center of gravity of the movable section is with respect to the movable section, the more easily the movable section returns from the turned state to a state where the end portion of the contact section protrudes farther upward in the vertical direction than the loading surface.

According to the embodiments, the weight member turns around the second axis. Therefore, in a case where the contact section is pushed inward from the outside of the loading table, a distance from the axis to the end of the weight member is shorter than a case where the contact section is not pushed. As a result, the end of the weight member can be prevented from protruding outward from the carriage due to the turning of the movable section.

According to the embodiments, when the freight is in contact with the contact section, the freight can be smoothly received because the reception support section supports the reception of the freight.

According to the embodiments, when the contact section catches the freight, displacement of the freight received on the loading table involves no particular problem because the damage prevention section prevents damage to the freight.

According to the embodiments, the movable section and at least one of the support section and the turn inhibiting section are opposite to each other in the direction in which the freight is received. Between the movable section and the part facing the movable section, a space is provided under a condition where the contact section is not pushed. Therefore, obstruction of the turning of the movable section can be prevented due to a foreign object being caught in at least one of the following: between the support section and the movable section, and between the turn inhibiting section and the movable section.

Note that the presently disclosed embodiments are merely examples in all aspects and should not be construed to be limiting. The scope of the present invention is indicated by the claims, rather than by the description given above, and includes all variations that are equivalent in meaning and scope to the claims.

REFERENCE SIGNS LIST

1 Carriage
10 Loading surface (flat surface on which freight is to be loaded)
11 Loading table
14 Fall prevention section
3 Support section
32, 411 Shaft member
4 Movable section
41 Weight member
42 Contact section
421 Reception support section
422 Damage prevention section
43 Base section
44 Weight section
5 Turn inhibiting section
A Freight

The invention claimed is:
1. A carriage comprising:
a loading table on which a flat surface is defined, the loading table configured to receive freight by horizontal movement from an end portion of the flat surface, the freight to be loaded on the flat surface; and
a fall prevention section provided on the end portion of the flat surface, and configured to prevent the freight from falling from the loading table, wherein
the fall prevention section includes:
a movable section configured to turn around an axis extending in a direction perpendicular to both a vertical direction and a direction in which the freight is received; and
a turn inhibiting section provided between the flat surface and a horizontal plane on which the axis is present, and configured to limit a range in which the movable section turns,
the movable section includes:
a contact section that comes in contact with the freight; and
a weight section in which a center of gravity of the movable section is located,
the contact section has an end portion protruding farther upward in the vertical direction than the flat surface, the end portion moving farther downward in the vertical direction than the flat surface along with turning of the movable section around the axis when the contact section is pushed inward from outside of the loading table,
the turn inhibiting section stops the turning of the movable section around the axis by coming in contact with the contact section when the contact section is pushed outwards from inside of the loading table, and holds the end portion of the contact section farther upward in the vertical direction than the flat surface,
the weight section includes:
a base section joined to the contact section; and
a weight member joined to the base section,
the center of gravity of the movable section is located within the weight member, and
the weight member is joined to the base section so as to turn around a second axis parallel to the axis of the movable section.
2. The carriage according to claim 1, wherein
a reception support section configured to support reception of the freight is provided on the end portion of the contact section.
3. The carriage according to claim 1, wherein
the contact section catches the freight received on the loading table when the freight moves horizontally toward the end portion of the flat surface of the loading table, and
a damage prevention section configured to prevent damage to the freight to be caught by the contact section is provided on the end portion of the contact section.
4. The carriage according to claim 1, further comprising
a support section configured to support the movable section such that the movable section turns around the axis of the movable section, wherein
under a condition that the contact section is not pushed, a space is provided between the movable section and either or both the support section and the turn inhibiting section facing the movable section in the direction in which the freight is received.
5. The carriage according to claim 1, wherein
a reception support section configured to support reception of the freight is provided on the end portion of the contact section,
the contact section catches the freight received on the loading table when the freight moves horizontally toward the end portion of the flat surface of the loading table, and
a damage prevention section configured to prevent damage to the freight to be caught by the contact section is provided on the end portion of the contact section.
6. The carriage according to claim 1, further comprising
a support section configured to support the movable section such that the movable section turns around the axis of the movable section, wherein
a reception support section configured to support reception of the freight is provided on the end portion of the contact section, and
under a condition that the contact section is not pushed, a space is provided between the movable section and either or both the support section and the turn inhibiting section facing the movable section in the direction in which the freight is received.

7. The carriage according to claim 1, further comprising
a support section configured to support the movable section such that the movable section turns around the axis of the movable section, wherein
the contact section catches the freight received on the loading table when the freight moves horizontally toward the end portion of the flat surface of the loading table,
a damage prevention section configured to prevent damage to the freight to be caught by the contact section is provided on the end portion of the contact section, and
under a condition that the contact section is not pushed, a space is provided between the movable section and either or both the support section and the turn inhibiting section facing the movable section in the direction in which the freight is received.

8. The carriage according to claim 1, further comprising
a support section configured to support the movable section such that the movable section turns around the axis of the movable section, wherein
a reception support section configured to support reception of the freight is provided on the end portion of the contact section,
the contact section catches the freight received on the loading table when the freight moves horizontally toward the end portion of the flat surface of the loading table, and
a damage prevention section configured to prevent damage to the freight to be caught by the contact section is provided on the end portion of the contact section, and
under a condition that the contact section is not pushed, a space is provided between the movable section and either or both the support section and the turn inhibiting section facing the movable section in the direction in which the freight is received.

9. A carriage comprising:
a loading table on which a flat surface is defined, the loading table configured to receive freight by horizontal movement from an end portion of the flat surface, the freight to be loaded on the flat surface; and
a fall prevention section provided on the end portion of the flat surface, and configured to prevent the freight from falling from the loading table, wherein
the fall prevention section includes:
  a movable section configured to turn around an axis extending in a direction perpendicular to both a vertical direction and a direction in which the freight is received; and
  a turn inhibiting section provided between the flat surface and a horizontal plane on which the axis is present, and configured to limit a range in which the movable section turns,
the movable section includes:
  a contact section that comes in contact with the freight; and
  a weight section in which a center of gravity of the movable section is located,
the contact section has an end portion protruding farther upward in the vertical direction than the flat surface, the end portion moving farther downward in the vertical direction than the flat surface along with turning of the movable section around the axis when the contact section is pushed inward from outside of the loading table, the turn inhibiting section stops the turning of the movable section around the axis by coming in contact with the contact section when the contact section is pushed outwards from inside of the loading table, and holds the end portion of the contact section farther upward in the vertical direction than the flat surface,
the carriage further includes a support section configured to support the movable section such that the movable section turns around the axis of the movable section, and
under a condition that the contact section is not pushed, a space is provided between the movable section and either or both the support section and the turn inhibiting section facing the movable section in the direction in which the freight is received.

10. The carriage according to claim 9, wherein
the weight section includes:
  a base section which is continuous with the contact section; and
  a weight member joined to the base section, and
the center of gravity of the movable section is located within the weight member.

11. The carriage according to claim 9, wherein
a reception support section configured to support reception of the freight is provided on the end portion of the contact section.

12. The carriage according to claim 9, wherein
the contact section catches the freight received on the loading table when the freight moves horizontally toward the end portion of the flat surface of the loading table, and
a damage prevention section configured to prevent damage to the freight to be caught by the contact section is provided on the end portion of the contact section.

13. The carriage according to claim 9, wherein
the weight section includes:
  a base section which is continuous with the contact section; and
  a weight member joined to the base section,
the center of gravity of the movable section is located within the weight member, and
a reception support section configured to support reception of the freight is provided on the end portion of the contact section.

14. The carriage according to claim 9, wherein
the weight section includes:
  a base section which is continuous with the contact section; and
  a weight member joined to the base section,
the center of gravity of the movable section is located within the weight member,
the contact section catches the freight received on the loading table when the freight moves horizontally toward the end portion of the flat surface of the loading table, and
a damage prevention section configured to prevent damage to the freight to be caught by the contact section is provided on the end portion of the contact section.

15. The carriage according to claim 9, wherein
a reception support section configured to support reception of the freight is provided on the end portion of the contact section,
the contact section catches the freight received on the loading table when the freight moves horizontally toward the end portion of the flat surface of the loading table, and a damage prevention section configured to prevent damage to the freight to be caught by the contact section is provided on the end portion of the contact section.

16. The carriage according to claim 9, wherein
the weight section includes:
- a base section which is continuous with the contact section; and
- a weight member joined to the base section, the center of gravity of the movable section is located within the weight member, a reception support section configured to support reception of the freight is provided on the end portion of the contact section, the contact section catches the freight received on the loading table when the freight moves horizontally toward the end portion of the flat surface of the loading table, and a damage prevention section configured to prevent damage to the freight to be caught by the contact section is provided on the end portion of the contact section.

* * * * *